US012481682B1

United States Patent
Margolin et al.

(10) Patent No.: US 12,481,682 B1
(45) Date of Patent: Nov. 25, 2025

(54) SYSTEM AND METHOD FOR ONE-TO-MANY MATCHING BETWEEN DISPARATE DATASETS

(71) Applicant: Intuit Inc., Mountain View, CA (US)

(72) Inventors: Itay Margolin, Tel Aviv (IL); Lior Tabori, Tel Aviv (IL); Shon Mendelson, Tel Aviv (IL); Hadas Baumer, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/030,519

(22) Filed: Jan. 17, 2025

(51) Int. Cl.
  *G06F 16/28* (2019.01)
  *G06F 16/22* (2019.01)
  *G06F 16/2455* (2019.01)

(52) U.S. Cl.
  CPC ........ *G06F 16/288* (2019.01); *G06F 16/2237* (2019.01); *G06F 16/24554* (2019.01)

(58) Field of Classification Search
  CPC .............. G06F 16/288; G06F 16/2237; G06F 16/24554
  USPC ................ 707/739, 769, 798, 999.01, 999.1, 707/999.001, 17.005
  See application file for complete search history.

(56) References Cited

U.S. PATENT DOCUMENTS

| | | | |
|---|---|---|---|
| 11,036,908 B1* | 6/2021 | Chingudi | G06N 5/04 |
| 2019/0362239 A1* | 11/2019 | Runkler | G05B 19/41865 |
| 2020/0265270 A1* | 8/2020 | Boudreau | G06N 20/00 |
| 2024/0070681 A1* | 2/2024 | Cheng | G06F 16/215 |
| 2025/0191031 A1* | 6/2025 | Heinonen | G06F 16/285 |

OTHER PUBLICATIONS

Vaswani, A., et al., "Attention is All you Need", 31st Conference on Neural Information Processing Systems (NIPS 2017), Aug. 2, 2023, 15 pages.

\* cited by examiner

*Primary Examiner* — Md I Uddin
(74) *Attorney, Agent, or Firm* — Lathrop GPM LLP (57) ABSTRACT

A method including receiving a command to perform a one-to-many matching task between first and second datasets. The first and second datasets are vectorized into first and second embedded datasets. A first self-attention model is executed on the first embedded dataset to generate a first attention dataset in which each value of a first number of first features of the first dataset is weighted based on each other value of the first number of first features. A second self-attention model is executed on the second embedded dataset to generate a second attention dataset in which each value of a second number of second features of the second dataset is weighted based on each other value of the second number of second features. The first and second attention datasets are combined into a relationship matrix expressing relationships between the first and second features. The method also includes returning the relationship matrix.

18 Claims, 5 Drawing Sheets

SYSTEM AND METHOD FOR ONE-TO-MANY MATCHING BETWEEN DISPARATE DATASETS

BACKGROUND

Computational matching between disparate datasets is a technical problem. While computers are efficient at matching datasets that are similar to each other, when the datasets are disparate there may be indirect references between the datasets that a computer processes with difficulty, if at all. In some cases, particularly when the computational matching problem may involve one-to-many matching, the problem may become impossible or impractical.

As an example presented only to highlight the technical problem, consider the problem of matching transactions contained in a bank statement with invoices stored in an electronic ledger. In many cases, a single line may correspond to multiple invoices. For example, one deposit in the bank transaction may be matched with twenty invoices sent to customers.

Because the bank statement contains different information in different formats, relative to the invoices stored in the electronic ledger, and because the dollar amounts do not directly match between the bank statement and the invoices, performing the one-to-many matching problem on a computer may be computationally prohibitive. The computational problem becomes exponentially more difficult when a constraint is added to the matching problem.

For example, in the above bank statement to invoice matching problem, the dollar amounts should match (i.e., the requirement of a dollar amounts to match between the datasets is a constraint), in addition to identifying which invoices match a particular bank statement transaction. Solving such a problem requires roughly $2^N$ calculations, where "N" is the number of entities (e.g., transactions and bank statement lines). Thus, with just 50 such entities in each dataset, over one quadrillion calculations are used to solve the computational matching problem. If 100 entities exist in each dataset (a common occurrence in the above example), the number of calculations used is $10^{30}$ (one nonillion), which is beyond the computational capacity of most modern computers. If 1,000 test entities exist (common in a practical business application), then the number of calculations becomes $10^{301}$, which cannot be solved by modern computers.

The above example is presented to highlight the technical problem posed by one-to-many matching of disparate datasets, not to describe a financial calculation. As can be seen from the above example, improvement of a computer is desirable in order to solve the one-to-many matching problem of disparate datasets.

SUMMARY

One or more embodiments provide for a method. The method includes receiving a command to perform a one-to-many computer matching task between a first dataset and a second dataset disparate from the first dataset. The method also includes vectorizing the first dataset into a first embedded dataset. The method also includes vectorizing the second dataset into a second embedded dataset. The method also includes executing a first self-attention model on the first embedded dataset to generate a first attention dataset in which each value of a first number of first features of the first dataset is weighted based on each other value of the first number of first features. The method also includes executing a second self-attention model on the second embedded dataset to generate a second attention dataset in which each value of a second number of second features of the second dataset is weighted based on each other value of the second number of second features. The method also includes combining the first attention dataset and the second attention dataset into a relationship matrix expressing relationships between the first number of first features and the second number of second features. The method also includes returning the relationship matrix.

One or more embodiments also provide for a system. The system includes a computer processor and a data repository in communication with the computer processor. The data repository stores a first dataset and a second dataset disparate from the first dataset. The data repository also stores a command to perform a one-to-many computer matching task between the first dataset and the second dataset. The data repository also stores a first embedded dataset and a second embedded dataset. The data repository also stores a first attention dataset in which each value of a first number of first features of the first dataset is weighted based on each other value of the first number of first features. The data repository also stores a second attention dataset in which each value of a second number of second features of the second dataset is weighted based on each other value of the second number of second features. The data repository also stores a relationship matrix expressing relationships between the first number of first features and the second number of second features. The system also includes a first self-attention model and a second self-attention model. The system also includes a server controller which, when executed by the computer processor, performs a computer-implemented method. The computer-implemented method includes receiving the command. The computer-implemented method also includes vectorizing the first dataset into the first embedded dataset. The computer-implemented method also includes vectorizing the second dataset into the second embedded dataset. The computer-implemented method also includes executing the first self-attention model on the first embedded dataset to generate the first attention dataset. The computer-implemented method also includes executing the second self-attention model on the second embedded dataset to generate the second attention dataset. The computer-implemented method also includes combining the first attention dataset and the second attention dataset into the relationship matrix. The computer-implemented method also includes returning the relationship matrix.

A method of reconciling a first dataset to a second dataset disparate from the first dataset. The method includes receiving a command to perform a one-to-many computer matching task between the first dataset and the second dataset. The method also includes vectorizing the first dataset into a first embedded dataset. The method also includes vectorizing the second dataset into a second embedded dataset. The method also includes executing a first self-attention model on the first embedded dataset to generate a first attention dataset in which each value of a first number of first features of the first dataset is weighted based on each other value of the first number of first features. The method also includes executing a second self-attention model on the second embedded dataset to generate a second attention dataset in which each value of a second number of second features of the second dataset is weighted based on each other value of the second number of second features. The method also includes executing, on the first attention dataset, a first feedforward neural network to generate a first modified attention dataset. The method also includes executing, on the second attention dataset, a second feed neural network to generate a second modified attention dataset. The method also includes executing a dot product function on the first modified attention dataset and the second modified attention dataset to generate a table of scores assigned to each combination of the first dataset and the second dataset. The method also includes executing a sigmoid function on the table of scores to generate a bitwise binary cross entropy loss expression of the table of scores including a modified table of scores, wherein the modified table of scores includes cells having values of one or zero. A first value of one represents that a first selected feature in the first number of first features is matched with a second selected feature in the second number of second features. A second value of zero represents that the first selected feature in the second number of second features is not related to the second selected feature in the second number of second features. The method also includes matching, according to the modified table of scores, a matched dataset including a first entry in the first dataset matched to a number of second entries in the second dataset. The method also includes returning the matched dataset.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to an improvement to a computer to increase the computational efficiency of performing a one-to-many matching between disparate datasets. Thus, for example, when matching the entries in the disparate datasets otherwise would exceed the computing capacity of the computer, one or more embodiments may permit the computer to execute the desired one-to-many matching operation.

The technical problem may arise, as an example, in the context of financial management software that reconciles bank statements with electronic invoices in an electronic ledger. A single line in the bank statement (e.g., a deposit) may correspond to many entries in the electronic ledger (e.g., a combination of payments to multiple invoices stored in the electronic ledger). If merely 1000 electronic invoices are present to match to one bank statement (a very real scenario for even a medium sized business), then a direct approach to performing the one-to-many matching problem would require more computing capacity than a modern supercomputers. One or more embodiments address this, and other, technical computer problems that arise from the one-to-many matching problem.

Briefly, one or more embodiments may begin by receiving a command to perform a one-to-many computer matching task between a first dataset and a second dataset disparate from the first dataset. The first and second datasets are vectorized into first and second embedded datasets. The process of vectorization converts the datasets into data structures (i.e., the first and second embedded datasets) which are suitable for input into a type of machine learning model known as a self-attention module.

In particular, two self-attention modules are executed, one on each of the embedded datasets. The outputs of the self-attention modules are attention datasets. The attention datasets include weights that indicate the degree of relationship between each entry (feature) in a given dataset relative to other entries (features) in the given dataset.

Stated differently, for example, each value of a first number of first features of the first dataset is weighted based on each other value of the first number of first features. Thus, the self-attention modules determine the relative relationships of the features in the embedded dataset to each other.

Note, however, that the attention datasets do not contain information about the other attention dataset. In other words, the first self-attention module outputs a first attention dataset, the second self-attention module outputs a second attention dataset, and the first and second attention datasets are distinct and separate from each other.

However, it is known that the two datasets, though disparate, are at least indirectly related to each other. Furthermore, because the attention datasets include information about other entries in the respective attention datasets, a prediction may be inferred regarding which entries in a given attention dataset are related to the entries in the other dataset.

In particular, the two attention datasets may be combined in order to identify the relationships between the disparate datasets. Specifically, the attention datasets are combined into a relationship matrix. The relationship matrix expresses relationships between the features in the first attention dataset and the features of the second attention dataset. For example, the two attention datasets may be combined via a dot product operation, resulting in a relationship matrix that is a quantitative assessment of the relationships between the first features in the first embedded dataset and the second features in the second embedded dataset.

As a result, the relationships among the entries of the two disparate datasets are known. Accordingly, the relationship matrix represents a matching dataset. The matching dataset includes a number of the first entries in the first dataset matched to zero or more of the entries in the second dataset. Thus, if an entry in the first dataset is matched to many entries in the second dataset, then that one-to-many relationship is expressed in the relationship matrix. In an embodiment, if an entry in the second dataset is matched to many entries in the first dataset, then that one-to-many relationship also is expressed in the relationship matrix.

One or more embodiments are computationally efficient, compared to directly comparing all entries in the first dataset to all other entries in the second dataset. The computational efficiency of an attention module has a quadratic computational efficiency, meaning that the number of computations is roughly $N^2$. Again, "N" is the number of entries or features being compared. The computational efficiency of an embedding model is also roughly $N^2$. The computational efficiency of a dot product operation may be as high as $N^2$ (though usually the dot product computation may be reduced in complexity). With the execution of two embedding models, two attention modules, and one dot product application, the resulting computational efficiency is roughly $5*N^2$.

Thus, in an example, 1,000 entries in a first dataset are compared to 1,000 entries in a second dataset. One or more embodiments would use roughly $5*(1,000)^2$ calculations, resulting in a computational efficiency of roughly 5,000,000 calculations. A modern personal computer may solve such a computational problem in less than a second. In contrast, as described above, the direct solution to the one-to-many matching problem would use $10^{301}$ calculations, which cannot be completed by modern computers. Thus, one or more embodiments improve a computer to be able to perform the one-to-many matching problem quickly and accurately. Accordingly, one or more embodiments represent a technical solution to the technical problem identified above.

One or more embodiments have multiple uses. In one such use, continuing the example above, one deposit (a first entry) of a bank statement (first dataset) may be matched to multiple invoices (second entries) in an electronic ledger (second dataset). Namely, the relationship matrix shows the relationship of the deposit to multiple invoices. Accordingly, the matching dataset (i.e., the deposit to the multiple invoices) may be returned to a financial management application, which then automatically reconciles the multiple invoices to the one deposit accordingly.

Figure 1:
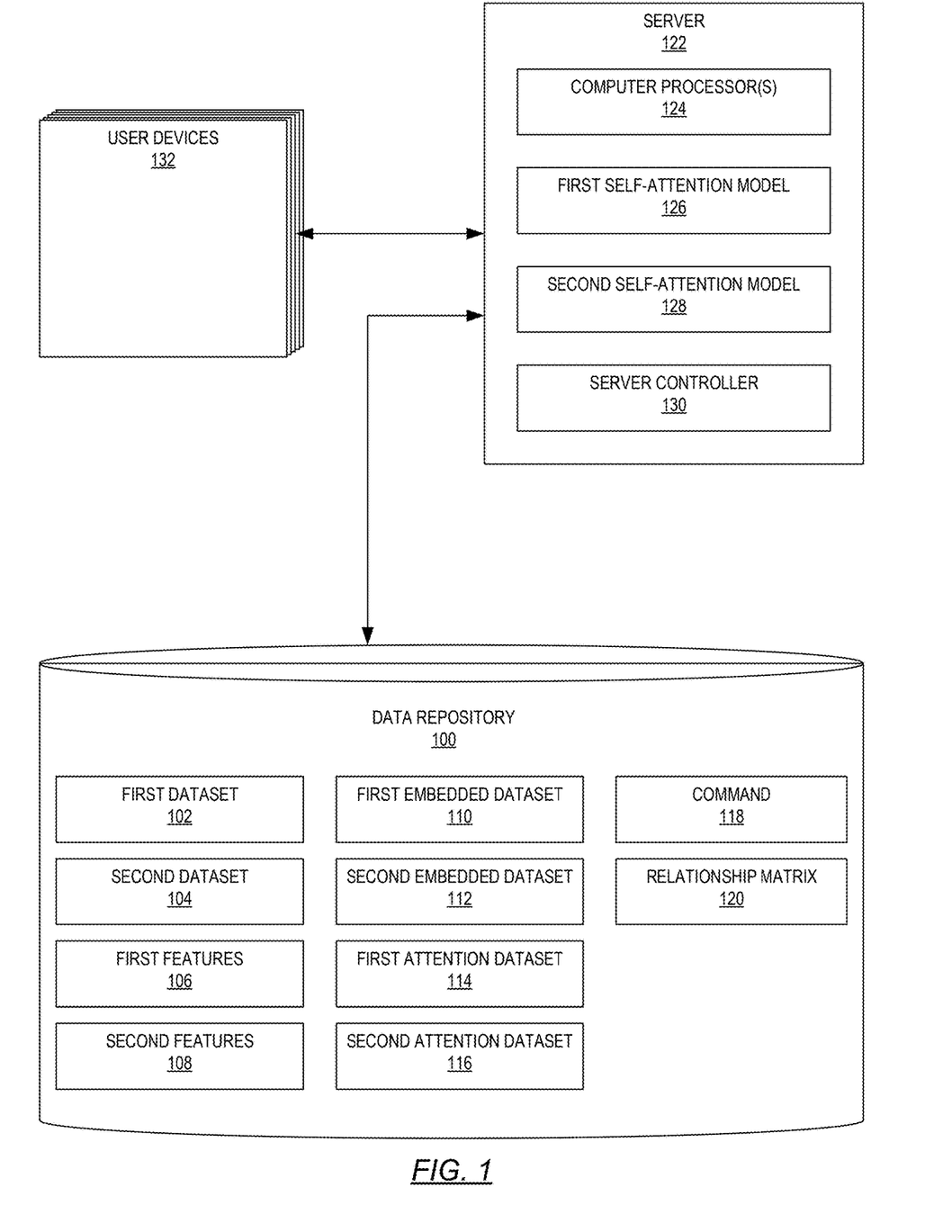
FIG. 1 shows a computing system, in accordance with one or more embodiments.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a first dataset (102). The first dataset (102) is a set of data containing a number of entries. Each entry may include one or more data items representing one or more aspects of the entry. Thus, for example, if the first dataset (102) is a bank statement, the bank statement includes a number of entries (transaction lines), and each transaction line includes one or more data items (description, date, dollar amount, etc.) The first dataset (102) is stored in the data repository (100) in one or more of many possible electronic formats.

The second dataset (104) is like the first dataset (102) in that the second dataset (104) also is a set of data that contains another number of entries which may be more, less, or the same as the number of entries in the first dataset (102). Thus, for example, if the second dataset (104) is an electronic ledger, the electronic ledger includes a number of entries (invoices), and each invoice includes one or more data items (customer number, date, dollar amount, etc.).

However, the second dataset (104) is disparate from the first dataset (102). The term "disparate from" means that the two datasets contain at least some different information. Often, "disparate from" means that the two datasets are stored in different data structure types relative to each other (e.g., the first dataset (102) may be in an image data structure and the second dataset (104) may be in a proprietary electronic ledger data structure).

Nevertheless, the second dataset (104) is related in at least some way to the first dataset (102). Thus, while disparate, the first dataset (102) and the second dataset (104) share at least some common information. As an example, the entries (transaction lines (e.g., first features (106))) in a bank statement (the first dataset (102)) are related in some fashion to the entries (invoices (e.g., second features (108))) in an electronic ledger (the second dataset (104)).

The data repository (100) also stores a number of first features (106). The first features (106) are an embedded representation of the first entries in the first dataset (102). An embedded representation is a data structure that is suitable for use by a machine learning model. An example of an embedded representation is a vector. A vector is defined as a number of features and a number of values for the features.

Similarly, the data repository (100) also stores a number of second features (108). Like the first features (106), the second features (108) are an embedded representation of the second entries in the second dataset (104).

Thus, the data repository (100) stores a first embedded dataset (110). The first embedded dataset (110) is the first dataset (102) stored in an embedded data format. Thus, the first embedded dataset (110) may be a vector storing values for each of the first features (106). The first embedded dataset (110) is an output of an embedding machine learning model.

Similarly, the data repository (100) stores a second embedded dataset (112). The second embedded dataset (112) is the second dataset (104) stored in an embedded data format. Thus, the second embedded dataset (112) may be a vector storing values for each of the second features (108). The second embedded dataset (112) is an output of an embedding machine learning model, which may be the same or different than the embedding machine learning model, which generates the first embedded dataset (110).

The data repository (100) also stores a first attention dataset (114). The first attention dataset (114) is the output of the second self-attention module (128) when executed on the first embedded dataset (110). The first attention dataset (114) includes weights for each of the first features (106) in the first embedded dataset (110). The weights indicate the relative importance of any one feature in the first embedded dataset (110) to the other features in the first embedded dataset (110). Thus, the first attention dataset (114) stores not only the information contained in the first dataset (102), but the relative importance of each feature in the first embedded dataset (110) to other features in the first embedded dataset (110).

The data repository (100) also stores a second attention dataset (116). The second attention dataset (116), similar to the first attention dataset (114), is the output of the second self-attention module (128). Also similar to the first attention dataset (114), the second attention dataset (116) includes weights for each of the second features (108) in the second embedded dataset (112). Again, the weights indicate the relative importance of any one feature in the second embedded dataset (112) to the other features in the second embedded dataset (112). Thus, the second attention dataset (116) stores not only the information contained in the second dataset (104), but the relative importance of each feature in the second embedded dataset (112) to other features in the second embedded dataset (112).

The data repository (100) also stores a command (118). The command (118) is a computer readable command to the server (122) or a program executable by the server (122). In one or more embodiments, the command (118) is a command to perform a one-to-many computer matching task between the first dataset (102) and the second dataset (104).

The data repository (100) also stores a relationship matrix (120). The relationship matrix (120) is an output of a function that combines the first attention dataset (114) with the second attention dataset (116). In an embodiment, the relationship matrix (120) is the output of a dot product function executed on the first attention dataset (114) and the second attention dataset (116).

However, the relationship matrix (120) may be the result of additional operations performed after the output of the function that combines the first attention dataset (114) with the second attention dataset (116). For example, the relationship matrix (120) may be the output of a sigmoid function on the output of the function that combines the first attention dataset (114) with the second attention dataset (116). In this manner, the relationship matrix (120) may be expressed as matrix of "1"s and "0"s. Each "1" represents a relationship between one of the first features (106) and one or more of the second features (108) (and hence a relationship between one of the first entries in the first dataset (102) with one or more of the second entries in the second dataset (104)).

The system shown in FIG. 1A may include other components. For example, the system shown in FIG. 1A also may include a server (122). The server (122) is one or more computer processors, data repositories, communication devices, and supporting hardware and software. The server (122) may be in a distributed computing environment. The server (122) is configured to execute one or more applications, such as the first self-attention module (126), the second self-attention module (128), and the server controller (130). An example of a computer system and network that may form the server (122) is described with respect to FIG. 5A and FIG. 5B.

The server (122) includes a computer processor(s) (124). The computer processor(s) (124) is one or more hardware or virtual processors which may execute computer readable program code that defines one or more applications, such as the first self-attention module (126), the second self-attention module (128), and the server controller (130). An example of the computer processor(s) (124) is described with respect to the computer processor(s) (502) of FIG. 5A.

The server (122) also may include a first self-attention module (126). The first self-attention module (126) is a self-attention machine learning model that is executed on the first embedded dataset (110). A "self-attention" machine learning model is a neural network that allows the model to weigh the importance of different elements within an input sequence. Thus, the first self-attention module (126) attends to specific parts of the data to better understand relationships and dependencies between the data. Stated differently, the self-attention matrix determines the level of relevance between different elements in a sequence, allowing the model to focus on the most important relationships when generating a contextual representation.

The first self-attention module (126) uses an attention matrix. The "attention matrix" refers to a matrix determined by taking the dot product of the "query" and "key" matrices generated by the model during processing. The query and key matrices represent the attention scores between each pair of elements within a sequence. Thus, attention matrix is a data structure that represents how much each entry in a dataset is related to every other element in the sequence. Applying a softmax function, the attention matrix becomes a probability distribution that is used to weight the value matrix to generate the final output representation.

In most self-attention modules, including the first self-attention module (126) and the second self-attention module (128), the attention matrix is an intermediate step in the calculation of the output of the self-attention module. For example, in natural language processing, when processing a sentence, the attention matrix helps the model understand how each word relates to other words in the sentence, leading to better context awareness. Thus, the final output may be text that answers the query or processes the command given to a natural language processing machine learning model.

The second self-attention module (128) may be like the second self-attention module (128) in a data structure. The second self-attention module (128) may be the same model as the first self-attention module (126), though for reference the term "second" self-attention model is used to distinguish the execution of the model on the first embedded dataset (110) versus execution of the model on the second embedded dataset (112).

However, in another embodiment, the second self-attention module (128) may be a different machine learning model than the first self-attention module (126). For example, the second self-attention module (128) may be trained differently than the first self-attention module (126) in order to more accurately or more efficiently process the second embedded dataset (112), which may or may not be structurally similar to the first embedded dataset (110). In any case, the second self-attention module (128) executes on the second embedded dataset (112) to output the second attention dataset (116).

The server (122) also may include a server controller (130). The server controller (130) is software or application specific hardware which, when executed by the computer processor(s) (124), controls and coordinates operation of the software or application specific hardware described herein. Thus, the server controller (130) may control and coordinate execution of the first self-attention module (126), the second self-attention module (128), and the server controller (130). The server controller (130) also may coordinate execution of one or more embedding machine learning models that generate the first embedded dataset (110) from the first dataset (102) and the second embedded dataset (112) from the second dataset (104).

The system shown in FIG. 1A also may include one or more user devices (144). The user devices (144) may be considered remote or local. A remote user device is a device operated by a third-party (e.g., an end user of a chatbot) that does not control or operate the system of FIG. 1A. Similarly, the organization that controls the other elements of the system of FIG. 1A may not control or operate the remote user device. Thus, a remote user device may not be considered part of the system of FIG. 1A.

In contrast, a local user device is a device operated under the control of the organization that controls the other components of the system of FIG. 1A. Thus, a local user device may be considered part of the system of FIG. 1A.

Figure 5A:
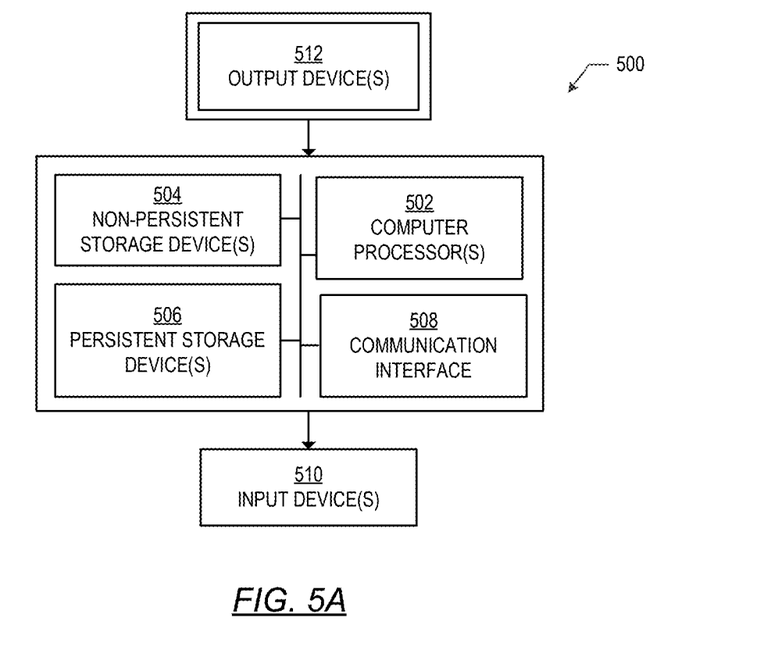
FIG. 5A and FIG. 5B show a computing system and network environment, in accordance with one or more embodiments.

In any case, the user devices (132) are computing systems (e.g., the computing system (500) shown in FIG. 5A) that communicate with the server (122). In an embodiment, the command (118) may be received from the user devices (132), either directly from a command issued by a user or from a command issued by an automated program executing on or called by the user devices (132). In another embodiment, one or more of the user devices (132) may be operated by a computer technician that services the various components of the system shown in FIG. 1A.

While FIG. 1 shows a configuration of components, other configurations may be used without departing from the scope of one or more embodiments. For example, various components may be combined to create a single component. As another example, the functionality performed by a single component may be performed by two or more components.

Figure 2:
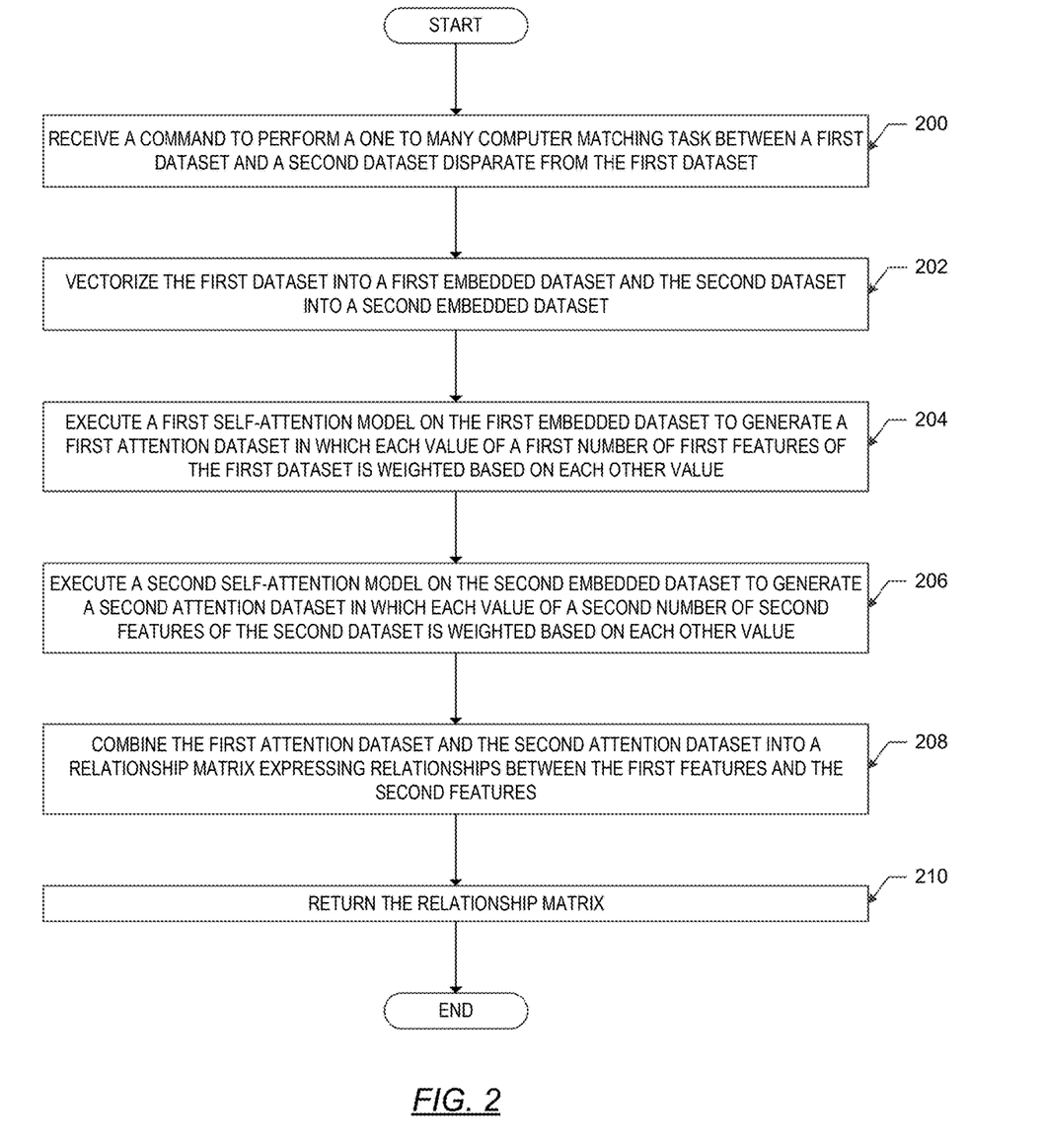
FIG. 2 shows a flowchart of a method for one-to-many matching between disparate datasets, in accordance with one or more embodiments.

FIG. 2 shows a flowchart of a method for one-to-many matching between disparate datasets, in accordance with one or more embodiments. The method of FIG. 2 may be implemented using the system of FIG. 1 and one or more of the steps may be performed on or received at one or more computer processors.

Step 200 includes receiving a command to perform a one-to-many computer matching task between a first dataset and a second dataset disparate from the first dataset. The command may be received via a communication interface of the server. In an embodiment, the command may be generated and executed on a local computer or on the server itself, in which case the command is still considered "received." The command may be received from other software applications that call the server controller to perform the one-to-many matching.

Step 202 includes vectorizing the first dataset into a first embedded dataset and vectorizing the second dataset into a second embedded dataset. Vectorizing of the two datasets may be performed by executing an embedding model on the first and second datasets. The same embedding model may be used for both datasets, if the data types are sufficiently compatible (e.g., both datasets are text files, but the information sets contained therein are different and thus the datasets are still "disparate.") However, different embedding models may be used when the two datasets use different data structures. In any case, the result of vectorizing the two datasets is that the first dataset is output as a first embedded dataset and the second dataset is output as the second embedded dataset.

Step 204 includes executing a first self-attention model on the first embedded dataset to generate a first attention dataset in which each value of a first number of first features of the first dataset is weighted based on each other value of the first features. Step 204 is performed by commanding the first dataset to execute on the first attention dataset.

The neural network of the first self-attention model generates weights that estimate the importance of different elements within an input sequence (i.e., the first attention dataset). Generating the weights quantifies the estimated relationships and dependencies between the data in the first embedded dataset. Stated differently, the self-attention matrix determines the level of relevance between different elements in in the first embedded dataset. In this manner, the model may focus on the most important relationships when generating a contextual representation of the first embedded dataset.

The first self-attention module generates an attention matrix. Again, the "attention matrix" refers to a matrix determined by taking the dot product of the "query" and "key" matrices generated by the self-attention model during processing. The query and key matrices represent the attention scores between each pair of elements within the first embedded dataset. Applying a softmax function, the attention matrix becomes a probability distribution that is used to weight the value matrix to generate the final output representation (i.e., the first attention dataset).

The attention matrix is generated as an intermediate step in the calculation of the output of the self-attention module. However, as indicated above, the self-attention matrix itself is the output of the first self-attention module with respect to the one or more embodiments. The attention matrix in the one or more embodiments is the first attention dataset.

Step 206 includes executing a second self-attention model on the second embedded dataset to generate a second attention dataset in which each value of a number of second features of the second dataset is weighted based on each other value of the second features. The second attention dataset is generated according to a similar process as described with respect to Step 204. However, again, in an embodiment a different self-attention model may be used to generate the second attention dataset.

Step 208 includes combining the first attention dataset and the second attention dataset into a relationship matrix expressing relationships between the first features and the second features. Combining the two attention datasets may be performed according to a number of different techniques.

In an embodiment, combining the two attention datasets may be performed by executing a dot product function on the first attention dataset and the second attention dataset. Executing the dot product function generates a table of scores assigned to each combination of the first dataset and the second dataset. The table of scores represent probabilities that the first features in the first dataset match the second features in the second dataset.

In an embodiment, combining the two attention datasets may perform additional functions after executing the dot product function. For example, combining also may include executing a sigmoid function on the table of scores. The sigmoid function forces each of the entries in the table of scores to be either zero or one. Thus, the execution of the sigmoid function generates a bitwise binary cross entropy loss expression of the table of scores.

The result of executing the sigmoid function is a modified table of scores where the cells of the modified table have values of one or zero. A value of "1" represents that a first selected feature in the first features is matched with a second selected feature in the second features. A value of "0" represents that the first selected feature in the second features is not related to the second selected feature in the second features.

In an embodiment, the modified table of scores may be referred to as an optimized attention matrix. The term "optimized," with respect to the table of scores relates to the suitability of the data structure (that defines the modified table of scores) for use as input to other applications.

In other embodiments, other types of combination functions may be performed. For example, the two attention datasets may be multiplied together, averaged, etc. Other variations are also possible.

Step 210 includes returning the relationship matrix. Returning the relationship matrix means that the relationship matrix is processed in some manner. For example, returning the relationship matrix may include displaying the relationship matrix. In a more specific example, the relationship matrix may be converted into a matched dataset that shows each entry in the first dataset as being matched to two or more entries in the second dataset (or vice versa).

In an embodiment, returning the relationship matrix may include transmitting the relationship matrix to a processing algorithm. The processing algorithm takes, as input, the relationship matrix. When executed, the external algorithm performs an external function. For example, the external algorithm may be a financial management application, and executing the financial management application on the relationship (or matched dataset) may include processing the datasets in an accounting ledger.

In an embodiment, returning the relationship matrix may include storing the relationship matrix. Thus, the relationship matrix may be made available for future use or display.

The method of FIG. 2 may be modified, such as by adding, removing, or modifying steps. For example, additional processing may be performed. In an embodiment, the method of FIG. 2 also may include executing, on the first attention dataset prior to combining and after executing the first attention model, a feedforward neural network. The feedforward neural network may be a multi-layer perceptron having a layer of fully connected neurons with nonlinear activation functions. Executing the feedforward neural network on the first attention dataset may generate a first modified attention dataset. In an embodiment, the feedforward neural network may perform a similar mathematical function as the self-attention module, but may cause the output (i.e., the first modified attention dataset) to have a same shape as the original dataset. For example, if the first dataset has a shape of a matrix of dimensions "d" by "n," then the first modified attention dataset will be a matrix of dimensions "d" by "n." A similar procedure may be performed on the second attention dataset to generate a second modified attention dataset. Modifying the shape of the output matrices of one or both of the attention datasets may be useful when performing the combination of the attention datasets at step 208.

In an embodiment, only the first attention dataset is modified. Thus, step 208 may include combining the first modified attention dataset with the second attention dataset.

In an embodiment, only the second attention dataset is modified. Thus, step 208 may include combining the first attention dataset with a second modified attention dataset.

In an embodiment, both attention datasets are so modified. Thus, the method may include executing on the first attention dataset, prior to combining and after executing the first attention model, a first feedforward neural network to generate a first modified attention dataset. Then, the method includes executing on the second attention dataset, prior to combining and after executing the second attention model, a second feedforward neural network to generate a second modified attention dataset. In this case, combining combines the first modified attention dataset with the second modified attention dataset.

While the various steps in this flowchart are presented and described sequentially, at least some of the steps may be executed in different orders, may be combined or omitted, and at least some of the steps may be executed in parallel. Furthermore, the steps may be performed actively or passively.

Figure 3:
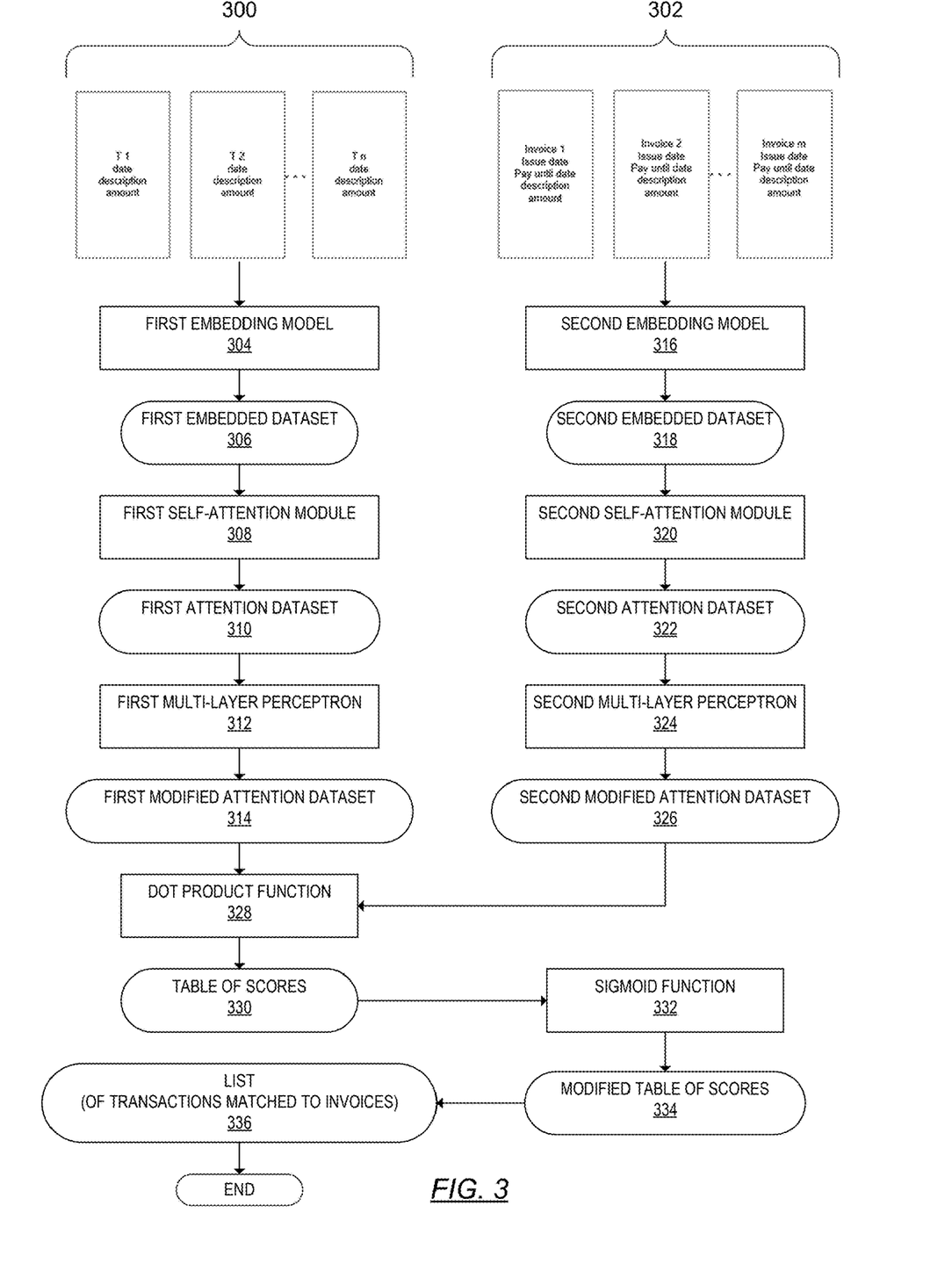
FIG. 3 shows a dataflow of a method for one-to-many matching between disparate datasets, in accordance with one or more embodiments.

FIG. 3 shows a dataflow of a method for one-to-many matching between disparate datasets, in accordance with one or more embodiments. The dataflow shown in FIG. 3 may be executed using the system shown in FIG. 1. The dataflow of FIG. 3 is a variation of the method of FIG. 2, showing the programs that perform the various steps of FIG. 2.

In the dataflow of FIG. 3, a first dataset (300) is to be matched to a second dataset (302). The first dataset (300) is a series of transactions (first entries) recorded in a bank statement (a first dataset). The second dataset (302) is a series of invoices (second entries) recorded in an electronic ledger of a user account (a second dataset).

Turning first to the first dataset (300), a first embedding model (304) embeds the first dataset (300) to generate a first embedded dataset (306). The first embedded dataset (306) is provided as input to a first self-attention module (308). The first self-attention module (308) outputs a first attention dataset (310). In turn, the first attention dataset (310) is provided to a first multi-layer perceptron (312) (a type of feedforward neural network described above) in order to generate the first modified attention dataset (314).

A similar procedure takes place with respect to the second dataset (302). The second dataset (302) is provided as input to a second embedding model (316), which outputs a second embedded dataset (318). The second embedded dataset (318) is provided as input to a second self-attention module (320). The second self-attention module (320) outputs a second attention dataset (322), which is provided as input to a second multi-layer perceptron (324). The second multi-layer perceptron (324) outputs a second modified attention dataset (326).

At this point, the first modified attention dataset (314) and the second modified attention dataset (326) are combined using a dot product function (328). The output of the dot product function (328) is a table of scores (330). As described above, the table of scores (330) represents the predicted relationships between the first entities in the first dataset (i.e., the transactions in the bank statement) and the second entities in the second dataset (i.e., the invoices in the electronic ledger).

In the example of FIG. 3, the table of scores (330) is provided as input to a sigmoid function (332). The output of a sigmoid function (332) is a modified table of scores (334). The modified table of scores (334) is also a table, but each of the values of the table are converted to either a "0" or a "1."

The modified table of scores (334) is then processed to generate a list (336) of transactions matched to invoices. Specifically, if a cell in the modified table of scores (334) has a value of "1," then a relationship exists between the particular transaction in the bank statement (a row in the modified table of scores (334)) and an invoice in the electronic ledger (a column in the modified table of scores (334)). Because each row may have multiple instances of "1" in the various columns, a one-to-many matching may be achieved between the bank transactions and the invoices. Thus, the list may include one transaction associated with multiple invoices, or multiple transactions associated with one invoice.

In an embodiment, the dataflow of FIG. 3 may terminate thereafter. However, the dataflow of FIG. 3 may be varied by adding, removing, or changing the order of the above-described steps and software components.

Figure 4:
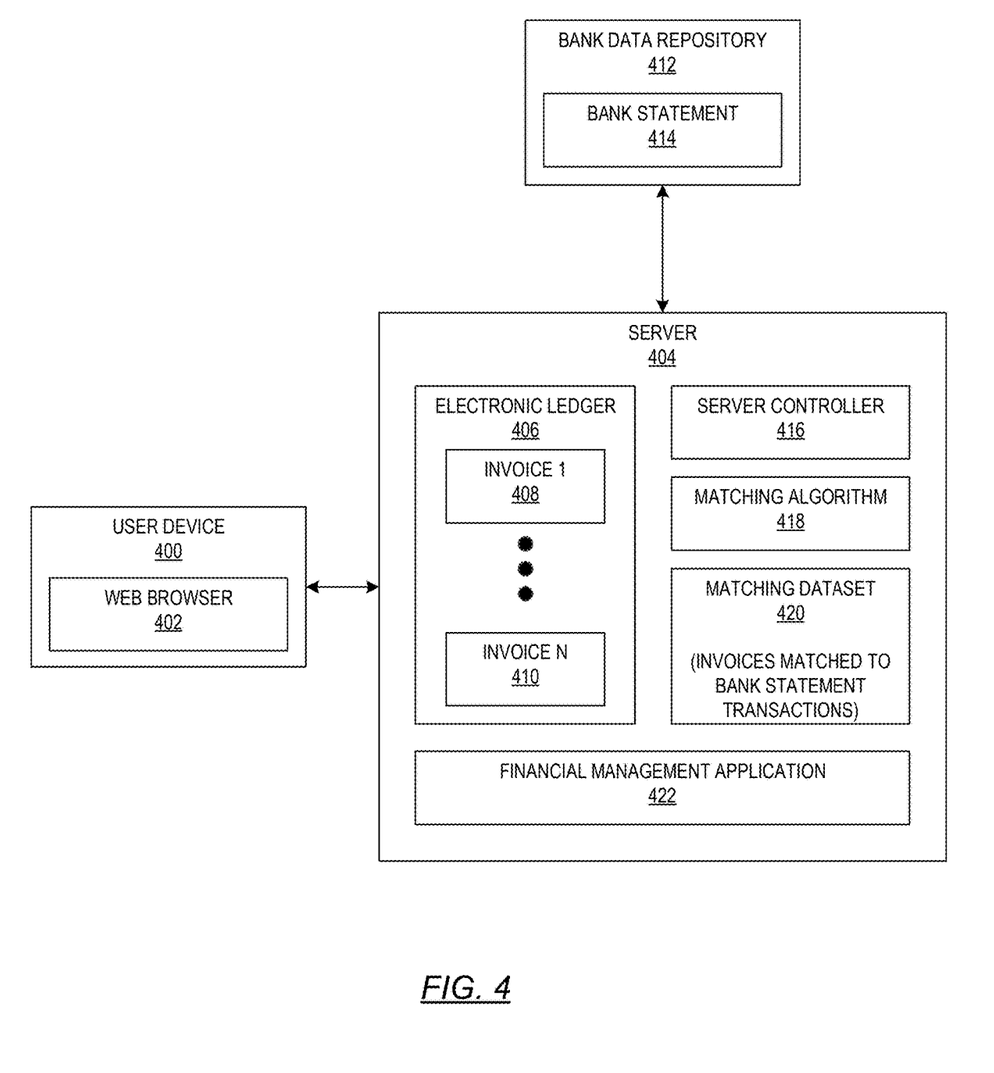
FIG. 4 shows an example of use of a method for one-to-many matching between disparate datasets, in accordance with one or more embodiments.

FIG. 4 shows an example of use of a method for one-to-many matching between disparate datasets, in accordance with one or more embodiments. The example of FIG. 4 may be executed using the system shown in FIG. 1 according to the method of FIG. 2 or the dataflow of FIG. 3.

In the example of FIG. 4, a user device (400) issues a command via a web browser (402) to reconcile an electronic ledger (406) having various invoices (i.e., invoice 1 (408) through invoice N (410)) with transactions shown in a bank statement (414), stored in a bank data repository (412). In response, the server (404) retrieves (or receives) the bank statement (414). A server controller (416) on the server (404) executes a matching algorithm (418). The matching algorithm (418) is the method of FIG. 2 (or the dataflow of FIG. 3).

The output of the matching algorithm (418) is a matching dataset (420). The matching dataset (420) is a list of the bank statement transactions, some of which are matched to multiple ones of the invoices in the electronic ledger (406).

The matching dataset (420) is then passed to a financial management application (422). The financial management application (422) properly reconciles, records, categorizes, and processes the bank statement transactions and the invoices accordingly.

The example of FIG. 4 is only an example of one use of one or more embodiments. One or more embodiments are not directed to financial applications, but rather to programming a computer to solve the one-to-many matching computational problem. The financial management application of FIG. 4, and the other financial management examples presented herein, thus merely illustrate one possible application of one or more embodiments.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
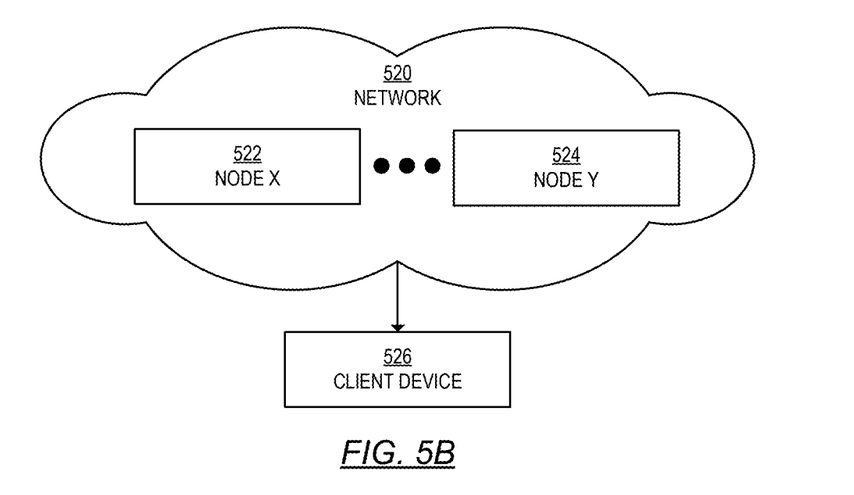

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
receiving a command to perform a one-to-many computer matching task between a first dataset and a second dataset disparate from the first dataset;
vectorizing the first dataset into a first embedded dataset;
vectorizing the second dataset into a second embedded dataset;
executing a first self-attention model on the first embedded dataset to generate a first attention dataset in which each value of a first plurality of first features of the first dataset is weighted based on each other value of the first plurality of first features;
executing a second self-attention model on the second embedded dataset to generate a second attention dataset in which each value of a second plurality of second features of the second dataset is weighted based on each other value of the second plurality of second features;
combining the first attention dataset and the second attention dataset into a relationship matrix expressing relationships between the first plurality of first features and the second plurality of second features,
wherein combining comprises executing a dot product function on the first attention dataset and the second attention dataset to generate a table of scores assigned to each combination of the first dataset and the second dataset, and
wherein the table of scores represent probabilities that the first plurality of first features in the first dataset match the second plurality of second features in the second dataset; and
returning the relationship matrix.

2. The method of claim 1, further comprising:
executing on the first attention dataset, prior to combining and after executing the first attention model, a feedforward neural network to generate a first modified attention dataset,
wherein the feedforward neural network comprises a multi-layer perceptron having a layer of fully connected neurons with nonlinear activation functions, and
wherein combining combines the first modified attention dataset with the second attention dataset.

3. The method of claim 1, further comprising:
executing on the second attention dataset, prior to combining and after executing the second attention model, a feedforward neural network to generate a second modified attention dataset,
wherein the feedforward neural network comprises a multi-layer perceptron having a layer of fully connected neurons with nonlinear activation functions, and
wherein combining combines the first attention dataset with the second modified attention dataset.

4. The method of claim 1, further comprising:
executing on the first attention dataset, prior to combining and after executing the first attention model, a first feedforward neural network to generate a first modified attention dataset,
executing on the second attention dataset, prior to combining and after executing the second attention model, a second feedforward neural network to generate a second modified attention dataset,
wherein the first feedforward neural network comprises a first multi-layer perceptron having a first layer of fully connected neurons with nonlinear activation functions,
wherein the second feedforward neural network comprises a second multi-layer perceptron having a second layer of fully connected neurons with nonlinear activation functions, and
wherein combining combines the first modified attention dataset with the second modified attention dataset.

5. The method of claim 1, further comprising:
executing a sigmoid function on the table of scores to generate a bitwise binary cross entropy loss expression of the table of scores comprising a modified table of scores,
wherein the modified table of scores comprises cells having values of one or zero,
having a first value of one representing that a first selected feature in the first plurality of first features is matched with a second selected feature in the second plurality of second features, and
having a second value of zero representing that the first selected feature in the second plurality of second features is not related to the second selected feature in the second plurality of second features.

6. The method of claim 1, wherein returning comprises at least one of:
displaying the relationship matrix,
transmitting the relationship matrix to a processing algorithm that takes, as input, the relationship matrix to perform an external function, and
storing the relationship matrix.

7. A system comprising:
a computer processor;
a data repository in communication with the computer processor and storing:
a first dataset,
a second dataset disparate from the first dataset,
a command to perform a one-to-many computer matching task between the first dataset and the second dataset,
a first embedded dataset,
a second embedded dataset,
a first attention dataset in which each value of a first plurality of first features of the first dataset is weighted based on each other value of the first plurality of first features, a second attention dataset in which each value of a second plurality of second features of the second dataset is weighted based on each other value of the second plurality of second features, and a relationship matrix expressing relationships between the first plurality of first features and the second plurality of second features;

a first self-attention model;

a second self-attention model; and a server controller which, when executed by the computer processor, performs a computer-implemented method comprising:

receiving the command, vectorizing the first dataset into the first embedded dataset, vectorizing the second dataset into the second embedded dataset, executing the first self-attention model on the first embedded dataset to generate the first attention dataset, executing the second self-attention model on the second embedded dataset to generate the second attention dataset, combining the first attention dataset and the second attention dataset into the relationship matrix, wherein combining comprises executing a dot product function on the first attention dataset and the second attention dataset to generate a table of scores assigned to each combination of the first dataset and the second dataset, and wherein the table of scores represent probabilities that the first plurality of first features in the first dataset match the second plurality of second features in the second dataset; and returning the relationship matrix.

8. The system of claim 7, wherein the computer-implemented method further comprises:

executing on the first attention dataset, prior to combining and after executing the first attention model, a feedforward neural network to generate a first modified attention dataset, wherein the feedforward neural network comprises a multi-layer perceptron having a layer of fully connected neurons with nonlinear activation functions, and wherein combining combines the first modified attention dataset with the second attention dataset.

9. The system of claim 7, wherein the computer-implemented method further comprises:

executing on the second attention dataset, prior to combining and after executing the second attention model, a feedforward neural network to generate a second modified attention dataset, wherein the feedforward neural network comprises a multi-layer perceptron having a layer of fully connected neurons with nonlinear activation functions, and wherein combining combines the first attention dataset with the second modified attention dataset.

10. The system of claim 7, wherein the computer-implemented method further comprises:

executing on the first attention dataset, prior to combining and after executing the first attention model, a first feedforward neural network to generate a first modified attention dataset, executing on the second attention dataset, prior to combining and after executing the second attention model, a second feedforward neural network to generate a second modified attention dataset, wherein the first feedforward neural network comprises a first multi-layer perceptron having a first layer of fully connected neurons with nonlinear activation functions, wherein the second feedforward neural network comprises a second multi-layer perceptron having a second layer of fully connected neurons with nonlinear activation functions, and wherein combining combines the first modified attention dataset with the second modified attention dataset.

11. The system of claim 7, wherein the computer-implemented method further comprises:

executing a sigmoid function on the table of scores to generate a bitwise binary cross entropy loss expression of the table of scores comprising a modified table of scores, wherein the modified table of scores comprises cells having values of one or zero, having a first value of one representing that a first selected feature in the first plurality of first features is matched with a second selected feature in the second plurality of second features, and having a second value of zero representing that the first selected feature in the second plurality of second features is not related to the second selected feature in the second plurality of second features.

12. The system of claim 7, wherein returning in the computer-implemented method further comprises at least one of:

displaying the relationship matrix, transmitting the relationship matrix to a processing algorithm that takes, as input, the relationship matrix to perform an external function, and storing the relationship matrix.

13. A method of reconciling a first dataset to a second dataset disparate from the first dataset, the method comprising:

receiving a command to perform a one-to-many computer matching task between the first dataset and the second dataset;

vectorizing the first dataset into a first embedded dataset;

vectorizing the second dataset into a second embedded dataset;

executing a first self-attention model on the first embedded dataset to generate a first attention dataset in which each value of a first plurality of first features of the first dataset is weighted based on each other value of the first plurality of first features;

executing a second self-attention model on the second embedded dataset to generate a second attention dataset in which each value of a second plurality of second features of the second dataset is weighted based on each other value of the second plurality of second features;

executing, on the first attention dataset, a first feedforward neural network to generate a first modified attention dataset;

executing, on the second attention dataset, a second feedforward neural network to generate a second modified attention dataset;

executing a dot product function on the first modified attention dataset and the second modified attention dataset to generate a table of scores assigned to each combination of the first dataset and the second dataset;

executing a sigmoid function on the table of scores to generate a bitwise binary cross entropy loss expression of the table of scores comprising a modified table of scores;

wherein the modified table of scores comprises cells having values of one or zero, having a first value of one representing that a first selected feature in the first plurality of first features is matched with a second selected feature in the second plurality of second features, and having a second value of zero representing that the first selected feature in the second plurality of second features is not related to the second selected feature in the second plurality of second features;

matching, according to the modified table of scores, a matched dataset comprising a first entry in the first dataset matched to a plurality of second entries in the second dataset; and returning the matched dataset.

14. The method of claim 13, wherein receiving the command comprises receiving the command from a user device via a communication interface, and wherein returning comprises returning the matched dataset to the user device.

15. The method of claim 13, wherein the first feedforward neural network comprises a first multi-layer perceptron having a first layer of fully connected neurons with nonlinear activation functions, and wherein the second feedforward neural network comprises a second multi-layer perceptron having a second layer of fully connected neurons with nonlinear activation functions.

16. The method of claim 13, wherein the table of scores represent probabilities that the first plurality of first features in the first dataset match the second plurality of second features in the second dataset.

17. The method of claim 13, wherein returning comprises at least one of:

displaying the matched dataset, transmitting the matched dataset to a processing algorithm that takes, as input, the matched dataset to perform an external function, and storing the matched dataset.

18. The method of claim 13, wherein the modified table of scores comprises an optimized attention matrix.

* * * * *